US012683842B2

(12) United States Patent
Li

(10) Patent No.: US 12,683,842 B2
(45) Date of Patent: Jul. 14, 2026

(54) DEMODULATION

(71) Applicant: Nordic Semiconductor ASA, Trondheim (NO)

(72) Inventor: Wei Li, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 28 days.

(21) Appl. No.: 18/996,818

(22) PCT Filed: Jul. 28, 2023

(86) PCT No.: PCT/EP2023/071090
§ 371 (c)(1),
(2) Date: Jan. 17, 2025

(87) PCT Pub. No.: WO2024/023348
PCT Pub. Date: Feb. 1, 2024

(65) Prior Publication Data
US 2026/0032030 A1      Jan. 29, 2026

(30) Foreign Application Priority Data

Jul. 29, 2022    (GB) ..................................... 2211122

(51) Int. Cl.
H04L 27/233        (2006.01)
H04L 5/00        (2006.01)

(52) U.S. Cl.
CPC ........ H04L 27/2331 (2013.01); H04L 5/0048 (2013.01)

(58) Field of Classification Search
CPC .......................... H04L 5/0048; H04L 27/2331
See application file for complete search history.

(56) References Cited

U.S. PATENT DOCUMENTS 4,128,828 A      12/1978   Samejima et al.
5,208,836 A       5/1993   Edbauer
(Continued)

FOREIGN PATENT DOCUMENTS

WO      WO 2014/167318 A2    10/2014

OTHER PUBLICATIONS

Combined Search and Examination Report mailed Jan. 18, 2023, issued for GB2211122.3 (6 pages).
(Continued)

*Primary Examiner* — David B Lugo
(74) *Attorney, Agent, or Firm* — Klarquist Sparkman, LLP

(57)        ABSTRACT

A receiver device comprises receiving circuitry configured to receive a radio signal modulated using frequency shift keying or phase shift keying, the radio signal comprising a plurality of successive symbol intervals, differential detector circuitry configured to multiply a signal for a current symbol interval with a first reference signal and output a first output signal for the current symbol interval, wherein the first reference signal corresponds to a conjugate of a signal for a first symbol interval preceding the current symbol interval and multiply the signal for the current symbol interval with a second reference signal and output a second output signal for the current symbol interval, wherein the second reference signal corresponds to a conjugate of a signal for a second symbol interval preceding the first symbol interval, in which the conjugate of the signal for the second symbol interval has been phase adjusted in dependence on a previous phase decision for the first symbol interval preceding the current symbol interval, combining circuitry configured to combine the first output signal for the current symbol interval and the second output signal for the current symbol interval to obtain a combined signal for the current symbol interval, and
(Continued)

decision circuitry configured to output a phase decision for the current symbol interval in dependence upon the combined signal.

16 Claims, 5 Drawing Sheets

(56)                    References Cited

U.S. PATENT DOCUMENTS

| | | | |
|---|---|---|---|
| 6,069,924 A | 5/2000 | Sudo et al. | |
| 2002/0034266 A1* | 3/2002 | Akahori ............... | H04L 27/227 |
| | | | 375/330 |
| 2008/0316909 A1* | 12/2008 | Yousef ............... | H04L 27/2075 |
| | | | 370/208 |
| 2009/0323865 A1 | 12/2009 | Bradley et al. | |
| 2014/0219666 A1 | 8/2014 | Tselniker et al. | |

OTHER PUBLICATIONS

International Search Report and Written Opinion mailed Sep. 11, 2023, issued for PCT/EP2023/071090 (14 pages).
Yongacoglu et al., "Differential Detection of GMSK Using Decision Feedback", *IEEE Transactions on Communications*, vol. 36, No. 6, Jun. 1988 (9 pages).

\* cited by examiner

Receive 610

Multiply 620

Multiply 630

Combine 640

Output 650

500

510

520

530

540

550

DEMODULATION

CROSS REFERENCE TO RELATED APPLICATIONS

This is the U.S. National Stage of International Application No. PCT/EP2023/071090, filed Jul. 28, 2023, which was published in English under PCT Article 21 (2), which in turn claims the benefit of GB Application No. 2211122.3, filed Jul. 29, 2022.

TECHNICAL FIELD

The present disclosure relates to methods and apparatus for demodulation of radio signals. In particular, the present disclosure relates to differential detection of radio signals using decision feedback.

BACKGROUND

In digital radio communication, a radio transmitter will typically use any one of a number of modulation techniques known in the art per se to alter the properties of a carrier signal such as the amplitude (amplitude modulation), the frequency (frequency modulation), or the phase (phase modulation) in response to the data that is to be transmitted.

At the receiver side, one or more detection schemes are available for obtaining a bit sequence from the incoming analogue waveform. Detection schemes for obtaining a bit sequence from a received waveform can generally be classified into coherent and non-coherent detection.

It is known that coherent detection generally requires carrier recovery means for compensating for frequency and phase differences between a received signal's carrier wave and a local oscillator of the receiver. Therefore, coherent detection implementations are generally more expensive and more complex than non-coherent detection implementations. However, whilst the use of non-coherent detection is desirable in terms of providing a lower complexity implementation, generally the performance of non-coherent detection falls short of that provided by coherent detection.

Differential detection is one possibility for detection of modulated radio signals that does not require a complex carrier recovery circuit. However, previous studies have shown that receivers employing differential detection generally suffer from poor noise performance resulting in poorer bit error rate (BER) performance than receivers employing coherent detection.

It is therefore desirable to provide a receiver device having improved performance whilst having a complexity lower than that required for coherent detection.

SUMMARY

According to a first aspect of the present invention there is provided a receiver device comprising:

receiving circuitry configured to receive a radio signal modulated using frequency shift keying or phase shift keying, the radio signal comprising a plurality of successive symbol intervals;

differential detector circuitry configured to:

multiply a signal for a current symbol interval with a first reference signal and output a first output signal for the current symbol interval, wherein the first reference signal corresponds to a conjugate of a signal for a first symbol interval preceding the current symbol interval; and multiply the signal for the current symbol interval with a second reference signal and output a second output signal for the current symbol interval, wherein the second reference signal corresponds to a conjugate of a signal for a second symbol interval preceding the first symbol interval, in which the conjugate of the signal for the second symbol interval has been phase adjusted in dependence on a previous phase decision for the first symbol interval preceding the current symbol interval;

combining circuitry configured to combine the first output signal for the current symbol interval and the second output signal for the current symbol interval to obtain a combined signal for the current symbol interval; and decision circuitry configured to output a phase decision for the current symbol interval in dependence upon the combined signal.

The invention extends to a method comprising:

receiving a radio signal modulated using frequency shift keying or phase shift keying, the radio signal comprising a plurality of symbol intervals;

multiplying, by differential detector circuitry, a signal for a current symbol interval with a first reference signal and outputting a first output signal for the current symbol interval, wherein the first reference signal corresponds to a conjugate of a signal for a first symbol interval preceding the current symbol interval;

multiplying, by the differential detector circuitry, the signal for the current symbol interval with a second reference signal and outputting a second output signal for the current symbol interval, wherein the second reference signal corresponds to a conjugate of a signal for a second symbol interval preceding the first symbol interval, in which the signal for the second symbol interval has been phase adjusted in dependence on a previous phase decision for the first symbol interval;

combining the first output signal and the second output signal to obtain a combined signal for the current symbol interval; and outputting a phase decision for the current symbol interval in dependence upon the combined signal.

The present invention further extends to computer software which, when executed by a receiver device, causes the receiver device to perform the methods set out herein.

Thus embodiments of the present invention provide an improved receiver device including differential detector circuitry that is assisted by at least one previous phase decision that is provided as a feedback decision from the decision circuitry to the differential detector circuitry. In particular, embodiments of the present disclosure provide a receiver device and methods in which the differential detector circuitry is operable to output at least the first output signal and the second output signal for the current symbol interval (also referred to as a first product signal and a second product signal in this disclosure). Therefore, two or more output signals are obtained for the same current symbol interval, in which the second output signal is obtained using decision feedback assistance.

Conventional differential detectors typically provide a single output signal that is then provided directly to decision circuitry for a phase decision. In accordance with the present invention, two or more output signals are obtained for the current symbol interval, and the combining circuitry is configured to combine the two or more output signals. The combined signal obtained by the combining circuitry may have a noise power that is reduced compared to a noise power for the output of a conventional 1-bit or 2-bit differential detector. The combined signal may therefore have enhanced quality compared to a signal output by a conventional differential detector, so that when the combined signal is output to the decision circuitry, this results in improved performance for the receiver device. Specifically, the combined signal can have an improved signal to noise ratio (SNR) relative to a signal output by a conventional differential detector, and consequently a receiver device in accordance with the invention can achieve improved performance (e.g. bit error rate performance) relative to existing differential detectors whilst keeping the relative lower complexity that is associated with differential detection.

In some embodiments, the receiver device is configured to use the phase decision for the current symbol interval as a feedback decision for obtaining a phase decision for one or more symbol intervals after the current symbol interval. In addition to outputting a phase decision for the current symbol interval in the manner set forth above, the receiver device can similarly use the phase decision for the current symbol interval as a feedback decision for use by the differential detector circuitry when obtaining a phase decision for a later symbol interval. The phase decision for the current symbol interval can thus be fed-back to assist the differential detector circuitry, thereby allowing the approach set out herein to be repeated for at least another symbol interval.

In particular, in the case of a next symbol interval that is subsequent and adjacent to the above mentioned current symbol interval, in some embodiments the differential detector circuitry is configured to:

multiply a signal for the next symbol interval with an updated first reference signal and output a first output signal for the next symbol interval, wherein the updated first reference signal corresponds to a conjugate of a signal for the current symbol interval preceding the next symbol interval; and multiply the signal for the next symbol interval with an updated second reference signal and output a second output signal for the next symbol interval, wherein the updated second reference signal corresponds to a conjugate of a signal for the first symbol interval preceding the current symbol interval, in which the conjugate of the signal for the first symbol interval has been phase adjusted in dependence on the phase decision for the current symbol interval, the combining circuitry being configured to combine the first output signal for the next symbol interval and the second output signal for the next symbol interval to obtain a combined signal for the next symbol interval, and the decision circuitry being configured to output a phase decision for the next symbol interval in dependence upon the combined signal for the next symbol interval.

Therefore, the phase decision previously output by the decision circuitry for the current symbol interval can be provided to the differential detector circuitry and used by the differential detector circuitry to provide an updated second reference signal for obtaining a second output signal for the next symbol interval. Therefore, the combined signal output by the combining circuitry for the next symbol interval, which is obtained by combining the first output signal for the next symbol interval and the second output signal for the next symbol interval, can also have reduced noise, and thus improved signal to noise ratio, compared to an output of a conventional differential detector. Improvement in receiver performance can therefore also be achieved for the next symbol interval. It will be appreciated that the receiver device can be configured to obtain a combined signal as described above for any number of symbol intervals and the above mentioned performance improvement can be obtained for a plurality of symbol intervals for a received radio signal.

In some embodiments, the differential detector circuitry is configured to multiply the signal for the current symbol interval with a third reference signal and output a third output signal for the current symbol interval, wherein the third reference signal corresponds to a conjugate of a signal for a third symbol interval preceding the second symbol interval, in which the conjugate of the signal for the third symbol interval has been phase adjusted in dependence on a previous phase decision by the decision circuitry for the second symbol interval and a previous phase decision by the decision circuitry for the first symbol interval.

In a set of embodiments, the differential detector circuitry is configured to further output at least a third output signal for the current symbol interval so that at least three output signals are obtained for the current symbol interval. In this case, the differential detector circuitry receives at least two phase decisions from the decision circuitry, namely a phase decision output by the decision circuitry for the first symbol interval preceding the current symbol interval and one or more phase decisions output by the decision circuitry for the second or further symbol intervals preceding the first symbol interval, and performs a phase adjustment of a conjugate of a signal for the third or further symbol intervals depending on the two or more phase decisions. Therefore, two or more previous phase decisions for the additional symbol intervals preceding the current symbol interval can be used as feedback decisions for applying phase adjustment to obtain the third or further reference signals that is/are multiplied with the signal for the current symbol interval. Hence more generally, what is sometimes referred to herein as two symbol-interval decision feedback (or more simply two decision feedback) may be used for obtaining three output signals for the current symbol interval, or a greater amount of symbol-interval decision feedback may be used for obtaining further output signals for the current symbol interval.

In some embodiments, the combining circuitry is configured to combine the first output signal for the current symbol interval, the second output signal for the current symbol interval and the third output signal for the current symbol interval to obtain the combined signal for the current symbol interval, and the decision circuitry is configured to output the phase decision for the current symbol interval in dependence upon the combined signal for the current symbol interval.

Therefore, three (or more) output signals may be obtained for the current symbol interval and combined by the combining circuitry to thereby output the combined signal. The combined signal obtained using three output signals may have reduced noise, and thus improved signal to noise ratio, compared to the combined signal obtained using just two output signals. The combined signal obtained using three output signals may therefore have enhanced quality compared to a signal output by a conventional differential detector and also have enhanced quality compared to a combined signal obtained using just two output signals. The combined signal is output to the decision circuitry for applying a decision thereto, which may result in improved performance for the receiver device as the decision can be made using a higher quality signal. Hence, in the case of two symbol-interval decision feedback by the receiver device, an improvement in performance can be achieved compared to the case of one symbol-interval decision feedback by the receiver device. More generally, the receiver device may use n-symbol-interval decision feedback, where n is an integer that is greater than or equal to 1 and increasing values of n may correlate with improved performance.

In some embodiments, the differential detector circuitry comprises a first delay circuit and a second delay circuit, wherein the first delay circuit is configured to output the conjugate of the signal for the first symbol interval preceding the current symbol interval, and wherein the second delay circuit is configured to output the conjugate of the signal for the second symbol interval preceding the first symbol interval. The first delay circuit and the second delay circuit can therefore each receive a conjugate of a signal for a given symbol interval and output the received signal after a period of time corresponding to a delay period.

In a set of embodiments, the delay period for the first delay circuit may be shorter than the delay period for the second delay circuit. Specifically, the first delay circuit may have a delay period corresponding to T, and the second delay circuit may have a delay period corresponding to 2T, where T is the time duration associated with a symbol interval. Therefore, the received signal for the first symbol interval preceding the current symbol interval can be input to the first delay circuit and output after a delay period of T, so that the T delayed signal can be output for use as the first reference signal for the signal for the current symbol interval. Similarly, the received signal for the second symbol interval preceding the first symbol interval can be input to the second delay circuit and output after a delay period of 2T, so that the 2T delayed signal can be output for use as the second reference signal for the current symbol interval. Hence more generally, the differential detector circuitry is capable of delaying a signal for a given symbol interval so that the delayed signal can be used as a reference signal for a symbol interval that is received after that given symbol interval.

In some embodiments, the differential detector circuitry comprises phase rotator circuitry configured to receive the conjugate of the signal for the second symbol interval preceding the first symbol interval and apply a phase adjustment in dependence on the previous phase decision for the first symbol interval preceding the current symbol interval. Thus in some embodiments, the phase rotator circuitry is operable to receive a signal and apply a phase adjustment to said received signal. A magnitude of the phase adjustment that is applied by the phase rotator circuitry can be determined by a phase decision that is provided by the decision circuitry as a feedback decision. In particular, the phase rotator circuitry can receive the conjugate of the signal for the second symbol interval and perform a phase adjustment for the received signal depending on a phase angle associated with the phase decision for the first symbol interval. The phase rotator circuitry can thus increment the phase of the conjugate of the signal for the second symbol interval according to a phase difference between the second and first symbol intervals and thereby obtain the second reference signal. The second reference signal obtained in this way can thus be multiplied with the signal for the current symbol interval to obtain the second output signal for the current symbol interval.

In some embodiments, the first delay circuit is configured to output the conjugate of the signal for the first symbol interval to first multiplier circuitry configured to output the first output signal, and the phase rotator circuitry is configured to output the signal for the second symbol interval preceding the first symbol interval and having the phase adjustment to second multiplier circuitry configured to output the second output signal. The differential detector circuitry can thus comprise the first multiplier circuitry configured to multiply the signal for the current symbol interval with the first reference signal and to output the first output signal for the current symbol interval according to the multiplication. The differential detector circuitry can also comprise the second multiplier circuitry configured to multiply the signal for the current symbol interval with the second reference signal and to output the second output signal for the current symbol interval according to the multiplication. Thus in some embodiments, the first multiplier circuitry receives the T delayed signal from the first delay circuit as the first reference signal, and the second multiplier circuitry receives the 2T delayed signal, which has been phase adjusted by the rotator circuitry, as the second reference signal.

In some embodiments, the differential detector circuitry comprises a plurality of delay circuits each configured to receive a signal for a same symbol interval of the plurality of symbol intervals and to output a respective time delayed version of the signal for the symbol interval, wherein each delay circuit is configured to output said respective time delayed version of the signal according to a different integer multiple of a time period corresponding to a respective symbol interval. Therefore, a signal for a given symbol interval can be received and, using the plurality of delay circuits, the signal can be delayed and output at a plurality of different times. The signal for the given symbol interval may firstly be delayed by a time T and therefore used for obtaining a first reference signal for a next symbol interval that is subsequent to and next to the given symbol interval. The signal for the given symbol interval may also be delayed by a time 2T and therefore used for obtaining a second reference signal for a symbol interval after and adjacent to the next symbol interval. Hence more generally, multiple delayed versions of a signal can be obtained and used for obtaining multiple reference signals. A number of reference signals obtained for multiplication with the signal for the current symbol interval is at least two but can in some cases be much greater than two.

The above discussion refers to using at least a first reference signal and a second reference signal and obtaining a first output signal and a second output signal, in which the second reference signal is obtained using a previous phase decision by the decision circuitry. However, some embodiments further include the possibility of using two or more previous phase decisions for obtaining the combined signal for the current symbol interval. By using a greater number of previous phase decisions (also referred to more generally in this disclosure as using a greater feedback depth) there is a further improvement in performance but also an increase in complexity. Therefore, in some embodiments the receiver device further comprises processing circuitry configured to select a number of previous phase decisions to be provided from the decision circuitry to the differential detector circuitry as feedback decisions for obtaining the combined signal for the current symbol interval. In this way, a number of previous phase decision that balances the trade off in improved performance and increased complexity can be selected according to a specific use case or an end user's needs. In particular, for cases where lower complexity is more important a smaller feedback depth may be used (e.g. one decision feedback or two decision feedback), whereas for cases where high performance is more important a greater feedback depth may be used (e.g. five decision feedback).

In some embodiments, the processing circuitry is configured to select a first number of previous phase decisions to be provided as feedback decisions from the decision circuitry to the differential detector circuitry for a first mode of operation, and the processing circuitry is configured to select a second number of previous phase decisions to be provided as feedback decisions from the decision circuitry to the differential detector circuitry for a second mode of operation. Therefore, in such embodiments the receiver device can be operated in different modes that differ from each other in respect of a number of feedback decisions used for obtaining the combined signal.

In some embodiments, the combining circuitry is configured to combine the first output signal and the second output signal according to either maximum ratio combining or equal gain combining.

In some embodiments, the receiver device further comprises matched filter bank detection circuitry, the matched filter bank detection circuitry comprising: correlator circuitry configured to estimate a frequency offset between a carrier frequency of the received radio signal and a nominal carrier frequency; means for correcting the frequency offset; and a matched filter bank (MFB) comprising a plurality of filters each of which corresponds to a different bit pattern, wherein the receiver device is configured to obtain information from a respective filter of the plurality of filters relating to a phase for the current symbol interval.

In some embodiments of the disclosure, the receiving circuitry is configured to receive a radio signal that has been modulated using one from the list consisting of: FSK; 2FSK; GFSK; 2 GFSK; DPSK; QPSK; and DQPSK.

BRIEF DESCRIPTION OF THE DRAWINGS

Certain embodiments of the present invention will now be described by way of example only, and with reference to the accompanying drawings, in which.

DETAILED DESCRIPTION

In the following description, a number of specific details are presented in order to provide a thorough understanding of the aspects of the present disclosure. It will be apparent, however, to a person skilled in the art that these specific details need not be employed to practice the techniques of the present disclosure. Conversely, specific details known to the person skilled in the art are omitted for the purposes of clarity where appropriate.

Figures 1, 2:
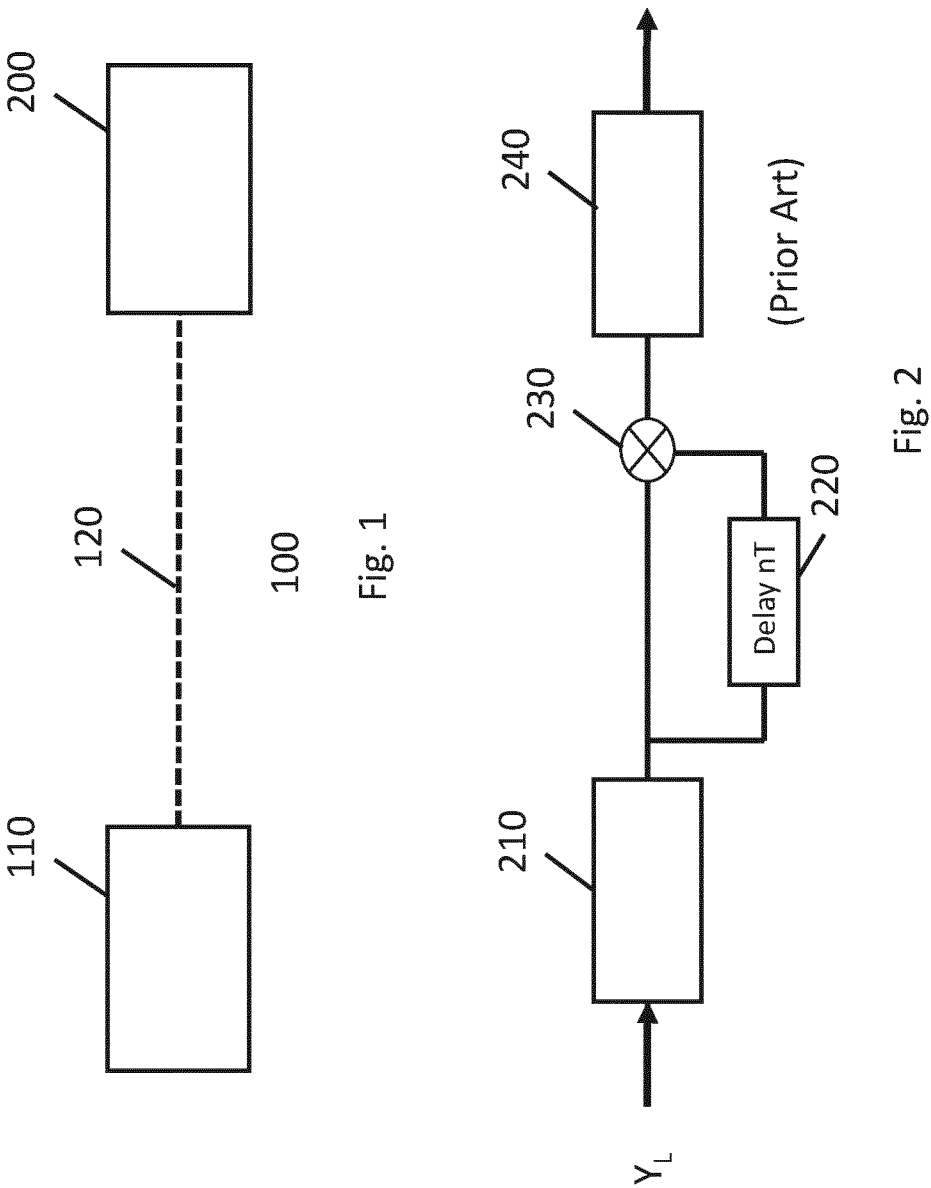
FIG. 1 is a schematic diagram illustrating an example of a radio communication system.
FIG. 2 is a schematic diagram illustrating an example of a conventional n-bit differential detector.

FIG. 1 schematically illustrates an example of a radio communication system 100 comprising a transmitter apparatus 110 and a receiver device 200 operable to communicate via a communications link 120. In the example shown, there is a single transmitter apparatus 110 and a single receiver device 200, however, it will be understood that the system 100 may comprise any suitable number of devices and in some examples the receiver device 200 may receive radio signals from a plurality of transmitter apparatuses and/or the transmitter apparatus 110 may transmit radio signals to a plurality of receiver devices. For example, the receiver device 200 may be a User Equipment (UE) device and the transmitter apparatus 110 may be a base station or another UE device. More generally, the receiver device 200 is operable to receive radio signals from the transmitter apparatus 110 via the communications link 120. The radio communication system 100 represents an example system that can be used to implement the techniques of the present disclosure.

The details regarding the transmitter apparatus 110 are generally known and are not discussed in detail. Generally, the transmitter apparatus 110 comprises: a modulator such as a frequency modulator or a phase modulator operable to modulate a radio signal having a carrier frequency; amplifier circuitry operable to amplify the modulated radio signal; and transmission circuitry operable to transmit the amplified radio signal.

Examples of suitable modulation techniques which may be used in embodiments of the invention include: Frequency Shift Keying (FSK), 2FSK; Gaussian Frequency-Shift Keying GFSK; 2 GFSK; Gaussian Minimum Shift Keying (GMSK); Differential Phase Shift Keying (DPSK); Quadrature Phase Shift Keying (QPSK); and Differential Quadrature Phase Shift Keying (DQPSK). Hence, the transmitter apparatus 110 is operable to transmit a radio signal modulated using frequency shift keying or phase shift keying, in which the radio signal comprises a plurality of successive symbol intervals each having a symbol duration. In some cases, the radio signal transmitted by the transmitter apparatus 110 (and received by the receiving device 200) may comprise a plurality of successive symbol intervals in which a guard interval is provided between at least some of the symbol intervals. For example, a guard interval may be provided after each symbol interval to provide a specified period of time before the next symbol interval. Any suitable time period may be used for such a guard interval.

Referring to the receiver device 200, the application of a conventional n-bit differential detector for detection of modulated signals at a receiver side is known. Whereas coherent detection schemes require recovery of the carrier signal and thus greater complexity, a conventional differential detector uses an input signal received in a previous symbol interval as a reference signal for an input signal received in a current symbol interval. However, it is known that the application of a conventional n-bit differential detector for differential detection of modulated signals can have poor noise characteristics.

FIG. 2 schematically illustrates an example of a conventional n-bit differential detector (e.g. n=1, 2 3 . . . ) comprising a bandpass filter 210; a delay circuit 220; a multiplier 230 and a low-pass filter 240. The input signal $Y_L$ to the n-bit differential detector comprises a radio signal modulated using a modulation technique such as FSK, GFSK, GMSK, DPSK, QPFSK or DQPSK. The output $Z_L$ of the n-bit differential detector is thus obtained by low pass filtering the output of the multiplier 230, in which the output of the multiplier 230 is a product of a signal received in a current symbol interval (referred to herein is $Y_L$) and a signal received in a previous symbol interval (such as $Y_{L-1}$ in the case of a 1-bit differential detector or $Y_{L-2}$ in the case of a 2-bit differential detector). For the purposes of explanation, an example of differential detection of a DPSK signal will be discussed. In the case that signals are sampled with correct timing, an FSK modulated signal can be regarded as a differentially modulated signal similar to DPSK.

An input DPSK signal received at the input of the n-bit differential detector for a symbol interval L can be expressed as:

$$Y_L = e^{i\sum_{K=0}^{L}\theta_K} + n_L,$$

in which $\theta_K$ is a phase increment/change corresponding to the symbol interval prior to the L-th symbol interval (i.e. symbol interval L−1, or also referred to as symbol interval K) and $n_L$ is the noise component at the L-th symbol interval. In the case of a 1-bit differential detector, the output of the differential detector is obtained by low pass filtering the product of the signal $Y_L$ and a conjugate of the signal $Y_{L-1}$ (where $Y_{L-1}$ is the signal received in the symbol interval preceding the symbol interval L). In this case, the delay circuit 220 is operable to output a delayed version of the input signal which is delayed by a time period T, where T is a time period corresponding to a symbol interval. Therefore, the output of the 1-bit differential detector for the symbol interval L can be expressed as:

$$Z_L = Y_L Y_{L-1}^* = \left(e^{i\sum_{K=0}^{L}\theta_K} + n_L\right)\left(e^{i\sum_{K=0}^{L-1}\theta_K} + n_{L-1}\right)^* = e^{i\theta_L} + w_L.$$

The output of the differential detector is provided to decision circuitry (not shown in FIG. 2) for applying a decision to thereby estimate 01 for the current symbol interval L.

Similarly, in the case of a 2-bit differential detector, the output of the differential detector is obtained by low pass filtering the product of $Y_L$ and $Y_{L-2}$ (where $Y_{L-2}$ is the signal received in a symbol interval that is two symbol intervals prior to the current symbol interval). Hence, the output of the detector can be expressed as: $Z_L = Y_L Y_{L-2}$, and the output of the differential detector is thus provided to the decision maker for applying a decision on Z to estimate $\theta_L$ for the current symbol interval L.

Referring again to the output $Z_L$ of the 1-bit differential detector for the symbol interval L, the term $W_L$ is used to represent the noise terms and can be expressed as:

$$W_L = n_L e^{-i\sum_{K=0}^{L-1}\theta_K} + \left(e^{i\sum_{K=0}^{L}\theta_K} + n_L\right)n_{L-1}^*,$$

in which $$n_{L-1}^*$$

is the noise at the L−1 (or K-th) symbol interval. Therefore, as can be seen from the above equation, the noise component $W_L$ for the output of the conventional 1-bit differential detector is typically greater than the noise component $n_L$ due to the presence of the additional noise component $$n_{L-1}^*$$

and therefore conventional differential detection can thus suffer from significant performance degradation.

Embodiments of the invention will now be discussed with reference to FIGS. 3a-3c. These embodiments provide decision feedback assisted differential detection that enhances performance of a receiving apparatus.

Figure 3B:
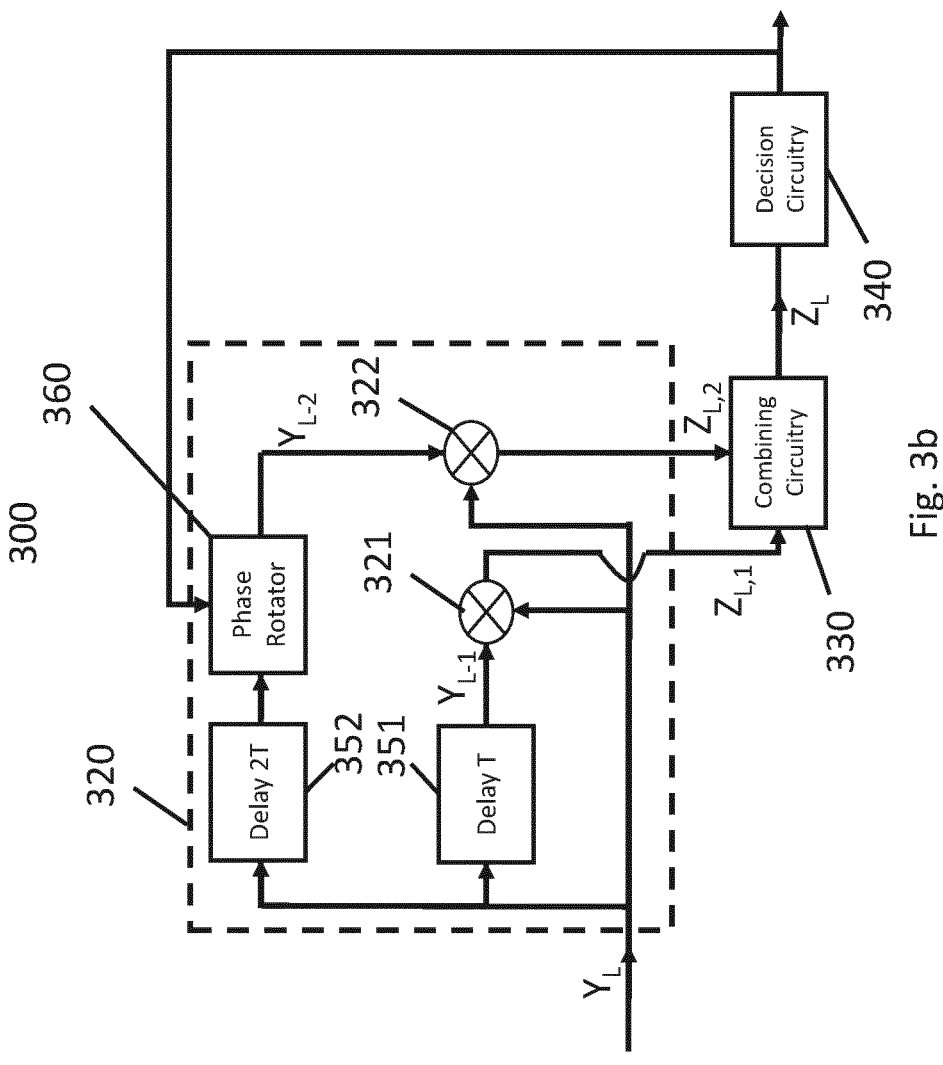
FIGS. 3b and 3c are schematic diagrams illustrating examples of a receiver device in accordance with embodiments of the present invention.
Figure 3A:
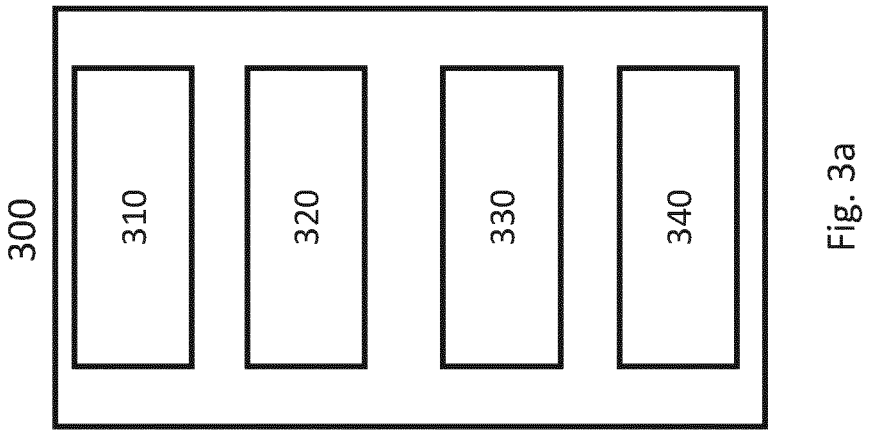
FIG. 3a is a schematic diagram illustrating a receiver device in accordance with embodiments of the present invention.

FIG. 3a is a schematic diagram illustrating a receiver device 300 in accordance with an embodiment of the present invention. The receiver device 300 comprises receiving circuitry 310, differential detector circuitry 320, combining circuitry 330 and decision circuitry 340.

The receiving circuitry 310 receives a radio signal modulated using frequency shift keying or phase shift keying, the radio signal comprising a plurality of successive symbol intervals. The successive symbol intervals each have an associated time duration (herein referred to as T) and each symbol interval is used to convey one or more bits of data using either frequency shift keying or phase shift keying.

The differential detector circuitry 320 receives the radio signal comprising the plurality of successive symbol intervals and outputs at least two output signals for a given symbol interval (e.g. symbol interval L). The operations for obtaining the at least two output signals (also referred to as product signals) for the given symbol interval will be discussed in more detail below but generally at least one of the output signals is obtained using a previous phase decision by the decision circuitry 340. The at least two output signals obtained for the given symbol interval are output to the combining circuitry 330. The combining circuitry 330 combines the at least two output signals using any suitable combination technique, such as equal gain combining (EGC) or maximal ratio combining (MRC), to thereby obtain a combined signal. The combined signal obtained by the combining circuitry 330 has reduced noise compared to a signal output by the differential detector shown in FIG. 2 and therefore the combined signal provided to the decision circuitry 340 results in improved performance with a lower BER.

In the following discussion, a current symbol interval will be referred to as symbol interval L, a first symbol interval that precedes the symbol interval L will be referred to as symbol interval L−1 (or symbol interval K), and a second symbol interval that precedes the first symbol interval L−1 will be referred to as symbol interval L−2 (or symbol interval J). In other words, the symbol interval L−1 precedes and is adjacent to the symbol interval L, and the symbol interval L−2 precedes and is adjacent to the symbol interval L−2. Hence, the receiver device 300 is configured to receive the signals for the successive symbol intervals J, K, L in that order so that the signal for symbol interval J is received during a time period t1, the signal for symbol interval K is received during a time period t2, and the signal for symbol interval L is received during a time period t3, in which the time period t1 precedes the time period t2, and the time period t2 precedes the time period t3. Any suitable symbol rate may be used.

Therefore, generally speaking, at the time of processing the signal for the symbol interval L to obtain a phase decision for the symbol interval L, the signals for the symbol intervals J and K have previously been received by the receiver device. Moreover, the present applicant has realised that in addition to this a phase decision that has also been obtained for the symbol interval K (and optionally J) can be used to provide decision feedback for improving performance when obtaining a phase decision for the symbol interval L.

The differential detector circuitry 320 comprises means for receiving a signal for a given symbol interval (e.g. symbol interval L–1) and delaying the signal for the given symbol interval by an appropriate delay time nT, where n is an integer and T is a time duration associated with a symbol interval. Therefore, a signal from an earlier symbol interval (e.g. symbol interval L–1) can be delayed by a time period nT corresponding to one or more symbol intervals and then multiplied with a signal from another symbol interval received after the given symbol interval, such as the symbol interval L.

Hence more generally, the differential detector circuitry 320 multiplies a signal $Y_L$ for the symbol interval Y with a conjugate of a signal $Y_{L-1}$ received for the symbol interval L–1 to thereby obtain a first output signal (first product signal) for the symbol interval L.

In addition, the differential detector circuitry 320 multiplies the signal $Y_L$ with a conjugate of a signal $Y_{L-2}$ received for the symbol interval L–2 to thereby obtain a second output signal (second product signal), in which the conjugate of the signal $Y_{L-2}$ for the symbol interval L–2 has been phase adjusted according to a previous phase decision output previously by the decision circuitry 340 for the symbol interval L–1. In particular, the previous phase decision for the symbol interval L–1 corresponds to a phase increment for the symbol interval L–1 relative to the symbol interval L–2. Therefore, the signal $Y_{L-2}$ can be phase adjusted according to a previous phase decision and multiplied with the signal $Y_L$ to obtain the second output signal for the symbol interval L.

FIG. 3*b* is a more detailed schematic diagram illustrating an example of the receiver device 300. The receiver device 300 comprises differential detector circuitry 320 configured to output the first output signal $Z_{L,1}$ for the symbol interval L and to also output the second output signal $Z_{L,2}$ for the symbol interval L.

In the embodiments shown in FIG. 3*b*, the differential detector circuitry 320 is schematically illustrated using the dashed line to emphasise the inputs (in this case the signal $Y_L$ for a current symbol interval and a decision by the decision circuitry 340 that is fed-back to the differential detector circuitry 320) and the outputs (in this case $Z_{L,1}$ and $Z_{L,2}$) for the differential detector circuitry 320. However, it will be appreciated that the combining circuitry 330 may in some cases be considered to form part of the differential detector circuitry 320 and the dashed line is provided to aid the reader's understanding.

The first output signal $Z_{L,1}$ of the differential detector circuitry 320 can be expressed as:

$$z_{L,1} = y_L y_{L-1}^* = \left( e^{i\Sigma_{K=0}^{L}\theta_K} + n_L \right)\left( e^{i\Sigma_{K=0}^{L-1}\theta_K} + n_{L-1} \right)^* = e^{i\theta_L} + w_{L,1}.$$

It will be appreciated from the equation above that the first output signal $Z_{L,1}$ is produced by multiplying the signal y for the current symbol interval L by a first reference signal $$y_{L-1}^*$$

corresponding to the conjugate of the signal $y_{L-1}$ for a first symbol interval L–1 preceding the current symbol interval L.

The second output signal $Z_{L,2}$ of the differential detector circuitry 320 can be expressed as:

$$z_{L,2} = y_L \left( y_{L-2} e^{i\hat{\theta}_{L-1}} \right)^* =$$

$$\left( e^{i\Sigma_{K=0}^{L}\theta_K} + n_L \right)\left( e^{i\left(\Sigma_{K=0}^{L-2}\theta_K + \hat{\theta}_{L-1}\right)} + n_{L-2} \right)^* = e^{i\theta_L} e^{i\left(\theta_{L-1} - \hat{\theta}_{L-1}\right)} + w_{L,2},$$

in which the term $\hat{\theta}_{L-1}$ represents the previous phase decision by the decision circuitry 340 for the first symbol interval preceding the current symbol interval (in this example symbol interval L–1). It will be appreciated from the equation above that the second output signal $Z_{L,2}$ is produced by multiplying the signal $y_L$ for the current symbol interval L by a second reference signal $(y_{L-2}e^{i\theta L-1})$, which can also be written as $y_{L-2}^* e^{i\theta L-1*}$. This second reference signal corresponds to the conjugate $y_{L-2}^*$ of the signal $y_{L-2}$ for a second symbol interval L–2 preceding the first symbol interval L–1, having been phase adjusted by $e^{i\theta L-1*}$—i.e. in dependence on the phase decision $\theta_{L-1}$ for the first symbol interval L–1.

In the case that the previous phase decision by the decision circuitry 340 for the symbol interval L–1 is correct, the term $\theta_{L-1}-\hat{\theta}_{L-1}$ in the above equation is equal to zero and therefore $Z_{L,2}$ can be expressed as:

$$z_{L,2} = e^{i\theta_L} + w_{L,2},$$

for which the term $W_{L,2}$ represents the noise component and can be expressed as:

$$w_{L,2} = n_L e^{-i\left(\Sigma_{K=0}^{L-1}\theta_K\right)} + \left( e^{i\Sigma_{K=0}^{L}\theta_K} + n_L \right)n_{L-2}^*,$$

and the term $$n_{L-2}^*$$

is the conjugate on the floor component for the L–2 symbol interval.

The two output signals $Z_{L,1}$ and $Z_{L,2}$ as defined above are thus output by the differential detector circuitry 320 to the combining circuitry 330. The combining circuitry 330 combines the two output signals $Z_{L,1}$ and $Z_{L,2}$ using, for example, equal gain combining. The example of applying equal gain combining is provided to demonstrate the benefits of the arrangements disclosed herein, however it will be appreciated that other suitable combining techniques may be used, such as maximum ratio combining.

The combining circuitry 330 combines the two output signals in accordance with the following expression to obtain the combined signal $Z_L$ for the symbol interval L:

$$z_L = \frac{(z_{L,1} + z_{L,2})}{2} =$$

$$e^{i\theta_L} + \frac{(w_{L,1} + w_{L,2})}{2} = e^{i\theta_L} + n_L e^{-i\Sigma_{K=0}^{L-1}\theta_K} + \left( e^{i\Sigma_{K=0}^{L}\theta_K} + n_L \right)\frac{(n_{L-1}^* + n_{L-2}^*)}{2}.$$

Consequently, in comparison with the example of the 1-bit differential detector described above with reference to FIG. 2, it can be seen that the output $Z_L$ of the 1-bit differential detector provided to the decision circuitry includes the term $$n_{l-1}^*$$

whereas the output $Z_L$ of the combining circuitry 330 instead includes the term $$\frac{(n_{L-1}^* + n_{L-2}^*)}{2},$$

thus resulting in reduced noise (and thus improved signal-to-noise ratio) for the signal provided to the decision circuitry 340 in the receiver device. Moreover, it can be seen that the noise power resulting from the term $$\left( e^{i\Sigma_{K=0}^{L} \theta_K} + n_L \right) \frac{(n_{L-1}^* + n_{L-2}^*)}{2}$$

is 3 dB less than that of $$\left( e^{i\Sigma_{K=0}^{L} \theta_K} + n_L \right) n_{L-1}^* \text{ or } \left( e^{i\Sigma_{K=0}^{L} \theta_K} + n_L \right) n_{L-2}^*.$$

As a result of this, in the techniques disclosed herein the combined signal obtained by the combining circuitry 330 and output to the decision circuitry 340 has an enhanced signal-to-noise ratio compared to a signal output by a conventional differential detector. The enhanced signal-to-noise ratio thus provides improved bit error rate (BER) performance for the receiver device.

Therefore, the receiver device 300 achieves improved performance relative to existing differential detectors whilst keeping the relative lower complexity that is associated with differential detection.

In the above example the receiver device 300 as shown in FIG. 3b provides the two output signals $Z_{L,1}$ and $Z_{L,2}$ to the combining circuitry 330. However, it will be appreciated that, optionally, further delayed signals such as $Y_{L-3}$, $Y_{L-4}$ (and so on) may also be used as part of the processing for outputting a phase decision for the current symbol interval L, thereby resulting in an increasing number of output signals (such as $Z_{L,1}$; $Z_{L,2}$; $Z_{L,3}$; and $Z_{L,4}$) being provided to the combining circuitry 330. Examples of using signals from further symbol intervals preceding the L-th symbol interval (also referred to more generally as using different amount of symbol feedback) are described in more detail below with reference to FIG. 3c.

Figure 4:
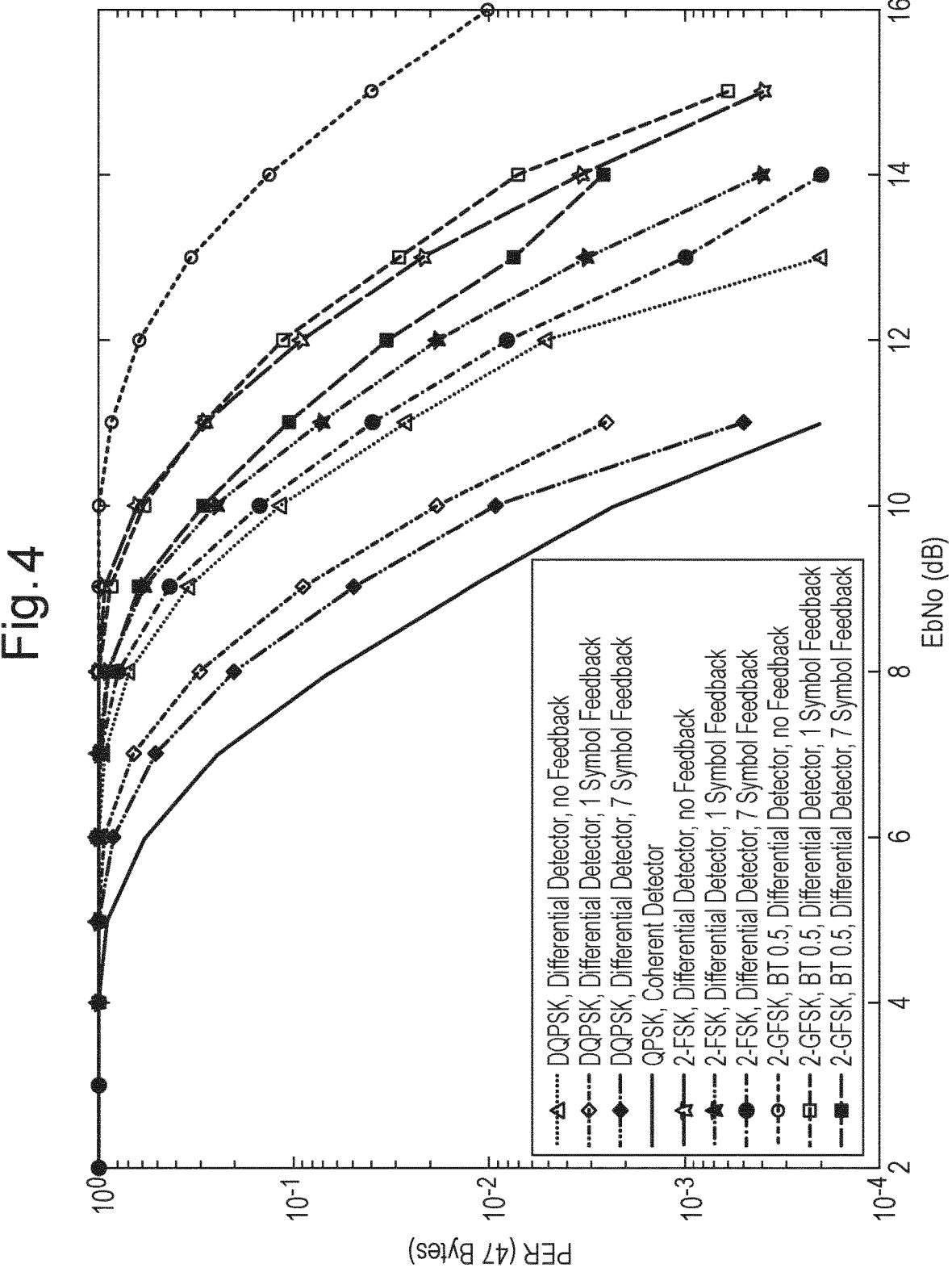
FIG. 4 is a plot showing simulation results for receiver devices.

FIG. 4 is a plot showing simulation results for the DQPSK, 2-FSK and 2-GFSK types of modulation. In the key of FIG. 4, the plots indicated as having "no feedback" represent the performance of a conventional 1-bit differential detector. The packet error rate (PER) vs Eb/No curves show that improvement in PER is achieved by the receiver device 300 for each of the types of modulation. In particular, for DQPSK it can be seen that in the case of using one decision feedback an improvement in performance over a conventional differential detector is achieved and as the number of feedback decisions increases the performance of the receiver device 300 approaches that of coherent detection of QPSK. For 2FSK, the improvement in performance can also be seen. It should be noted that the 2FSK simulations have been obtained using a non-optimal low pass filter (LPF). With a different LPF a performance more similar to that for DQPSK is to be expected. For 2GFSK, the improvement in performance can also be seen but has worse performance than that of 2FSK. The poorer performance obtained for 2GFSK compared to 2FSK is at least partially due to the inter-symbol-interference (ISI) arising from phase distortions added due to the Gaussian filter used before the FSK modulator. This will cause a bit performance degradation when a receiver treats GFSK as FSK and applies the enhanced differential detector without change.

It should be noted that the receiver device 300 advantageously obtains at least two output signals for a given symbol interval, and the resulting combined signal output by the combining circuitry 330 for the given symbol interval has improved signal to noise ratio such that the improvements are achieved for each of the types of modulation shown in FIG. 4. There is also scope to adapt the techniques of the present disclosure to optionally further compensate for distortions arising due to the Gaussian filter in GFSK and thereby reduce inter-symbol-interference.

Referring again to FIG. 3b, in this example the receiver device 300 comprises first multiplier circuitry 321 and second multiplier circuitry 322 each being configured to output a respective output signal (product signal). The first multiplier circuitry 321 is configured to multiply the signal $Y_L$ and the signal $Y_{L-1}$. The second multiplier circuitry 322 is configured to multiply the signal $Y_L$ and the signal $Y_{L-2}e^{i\theta L-1}$, in which the signal $Y_{L-2}e^{i\theta L-1}$ is output by the phase rotator circuitry by applying the decision for $\hat{\theta}_{L-1}$ to the signal $Y_{L-2}$.

Still referring to FIG. 3b, in this example the receiver device 300 comprises first delay circuitry 351 which outputs a signal with a delay period T and second delay circuitry 352 which outputs a signal with a delay period 2T. Therefore, when the signal $Y_L$ is provided as an input to the first multiplier circuitry 321, the conjugate of the signal $Y_{L-1}$ is provided (via the first delay circuitry 351) as an input to the first multiplier circuitry 321 and the first multiplier circuitry 321 thus multiplies the two input signals to produce the output signal $Z_{L,1}$. Similarly, when the signal $Y_L$ is provided as an input to the second multiplier circuitry 322, the conjugate of the signal $Y_{L-2}$ is provided (via the second delay circuitry 352 and the phase rotator 360) as an input to the second multiplier circuitry 322 and the second multiplier circuitry 322 thus multiplies the two input signals to produce the output signal $Z_{L,2}$.

Figure 3C:
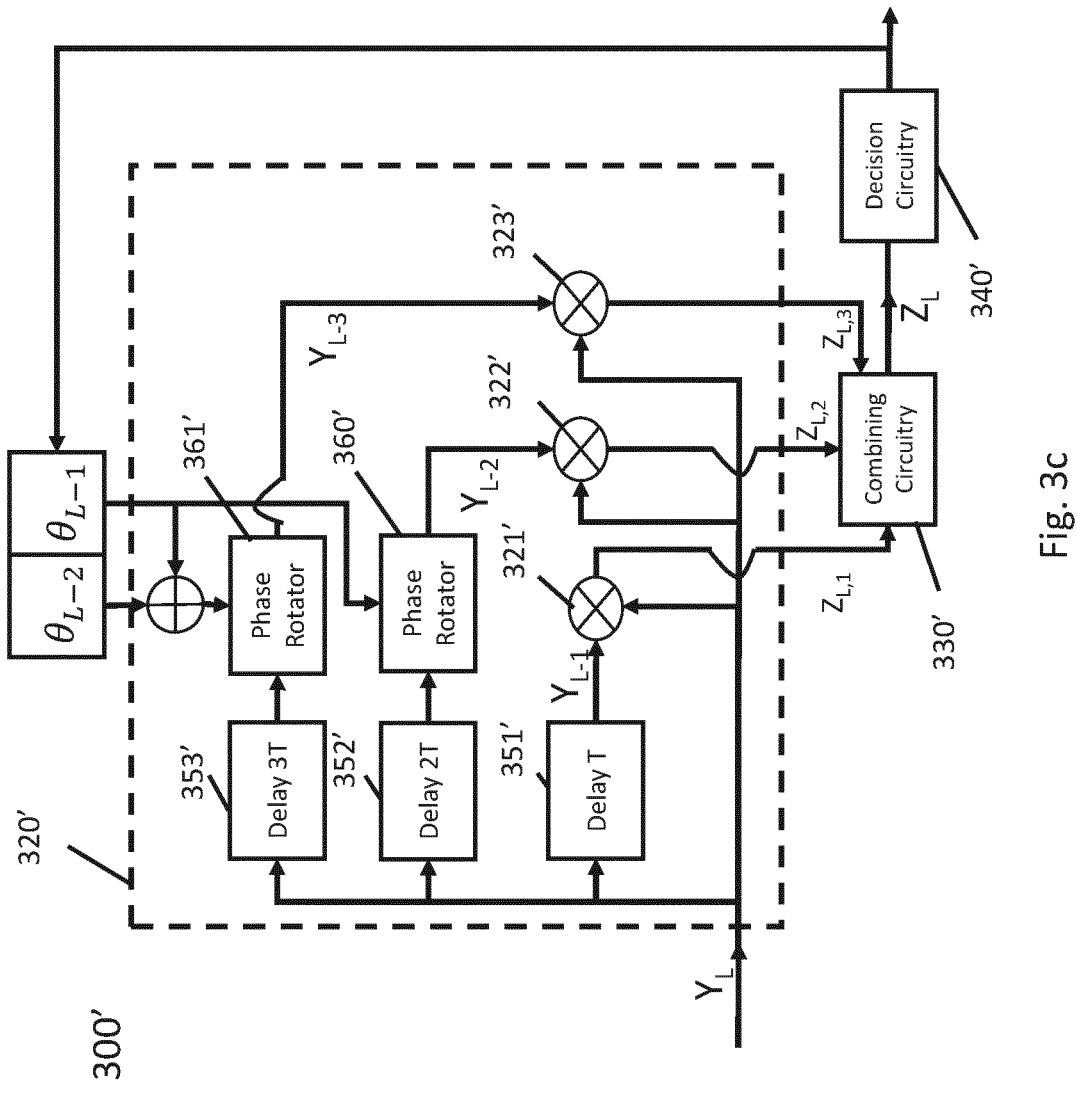

FIG. 3c is a schematic diagram illustrating another embodiment of a receiver device 300' in accordance with the invention. In this embodiment the receiver device 300' comprises differential detector circuitry 320' that outputs a first output signal $Z_{L,1}$ for the current symbol interval, a second output signal $Z_{L,2}$ for the current symbol interval and a third output signal $Z_{L,3}$ for the current symbol interval. The differential detector circuitry 320' multiplies the signal $Y_L$ for the current symbol interval with a third reference signal and output the third output signal $Z_{L,3}$ for the current symbol interval, wherein the third reference signal corresponds to a conjugate of a signal for a third symbol interval (L−3) preceding the second symbol interval, in which the conjugate of the signal for the third symbol interval has been phase adjusted in dependence on a previous phase decision $\hat{\theta}_{L-2}$ by the decision circuitry 340' for the second symbol interval (L−2) and a previous phase decision $\hat{\theta}_{L-1}$ by the decision circuitry 340 for the first symbol interval (L−1).

FIG. 3c schematically illustrates the previous phase decisions $\hat{\theta}_{L-1}$ and $\hat{\theta}_{L-2}$ that are provided as feedback decisions and used by the differential detector circuitry 320' to obtain the output signals $Z_{L,2}$ and $Z_{L,3}$ for the current symbol interval L. In this embodiment, the differential detector circuitry 320' further comprises third delay circuitry 353' configured to output a signal with a delay period 3T and phase rotator circuitry 361' configured to apply a phase adjustment to the signal in dependence upon the previous phase decisions $\hat{\theta}_{L-1}$ and $\hat{\theta}_{L-2}$. The differential detector circuitry 320' further comprises third multiplier circuitry 323'. Therefore, the signal $Y_L$ is provided as an input to the third multiplier circuitry 323' and the conjugate of the signal $Y_{L-3}e^{i\theta L-2}e^{i\theta L-1}$ is also provided as an input to the third multiplier circuitry 323'. Therefore, the third output signal $Z_{L,3}$ for the current symbol interval L can be expressed as:

$$z_{L,3} = y_L\left(y_{L-3}e^{i\hat{\theta}_{L-2}}e^{i\hat{\theta}_{L-1}}\right)^*.$$

Hence in FIG. 3c, two previous phase decisions for two symbol intervals preceding the current symbol interval can be used and three output signals are output by the differential detector circuitry 320' for the current symbol interval. The combining circuitry 330' is operable to combine the three output signals using equal gain combining, for example, thus resulting in a further improvement of the signal-to-noise ratio.

More generally, the principle described above with respect to FIGS. 3b and 3c can be applied to use an even greater number of feedback decisions than just the one or two feedback decisions mentioned above. In the case of using signals from N previous symbol intervals and thus using N-1 feedback decisions (where N is an integer greater than or equal to 2), a noise component for the combined signal output by the combining circuitry can be expressed as:

$$n_L e^{-i\Sigma_{K=0}^{L-1}\theta_K} + \left(e^{i\Sigma_{K=0}^{L}\theta_K} + n_L\right)\frac{\sum_{i=1}^{N}n_{L-i}^*}{N}.$$

It can therefore be seen that for larger values of N, the noise power is reduced.

Moreover, for increasing values of N (corresponding to larger amounts of feedback) it can be seen that the combined signal $Z_L$ output by the combining circuitry converges to $$e^{i\theta_L} + n_L e^{-i\Sigma_{K=0}^{L-1}\theta_K},$$

which corresponds to a signal model of PSK modulation. Therefore, in the case of increasing amounts of feedback, the receiver device of the present disclosure can achieve DPSK detection approaching the performance associated with coherent PSK detection.

Therefore, whilst FIG. 3c shows an embodiment in which the receiver device comprises three delay circuits, the receiver device may more generally comprise a plurality of delay circuits (e.g. up to 10 for example). For example, each delay circuit may comprise one or more sample and hold circuits.

In the schematic diagrams of FIGS. 3b and 3c, it will be appreciated that conjugation may be applied either before or after the delay circuits. Hence, either a conjugate of the signal $Y_L$ is input to the delay circuits or conjugation may be applied for a signal output by a delay circuit.

The receiver device 300 may optionally comprise processing circuitry configured to select a number of previous phase decisions to be provided from the decision circuitry 340 to the differential detector circuitry 320 as feedback decisions for obtaining the combined signal $Z_L$ for the current symbol interval. Therefore, put differently the receiver device 300 may comprise processing circuitry to control a feedback depth so that either a greater number or smaller number of feedback decisions can be provided to the differential detector circuitry 320 for use in obtaining a combined signal for a given symbol interval. The receiver device 300 may have a software configurable mode of operation such that the receiver device 300 has a plurality of modes of operation for which the feedback depth is different for each mode of operation. Therefore, the processing circuitry may select a first number of previous phase decisions to be provided as feedback decisions from the decision circuitry 330 to the differential detector circuitry 320 for a first mode of operation, and the processing circuitry may select a second number of previous phase decisions to be provided as feedback decisions from the decision circuitry 340 to the differential detector circuitry 320 for a second mode of operation. For example, in a first mode of operation a one-decision feedback depth may be used (e.g. corresponding to that shown in FIG. 3b), whereas in a second mode of operation a two-decision feedback depth may be used (e.g. corresponding to that shown in FIG. 3c). The receiver device 300 may thus have a plurality of modes of operation each corresponding to a different number of feedback decisions provided from the decision circuitry 340 to the differential detector circuitry 320.

More generally, there is a trade off in that obtaining a combined signal for a given symbol interval by using a greater number of previous phase decisions and a greater number of previously received signals can provide improved performance at the cost of increased processing and thus increased power consumption. Therefore, the receiver device 300 of the present invention comprises processing circuitry that can select a number of previous phase decisions and a number of previously received signals used to obtain a combined signal so that for certain use cases an end user can use a configuration appropriate to their requirements.

Figure 5:
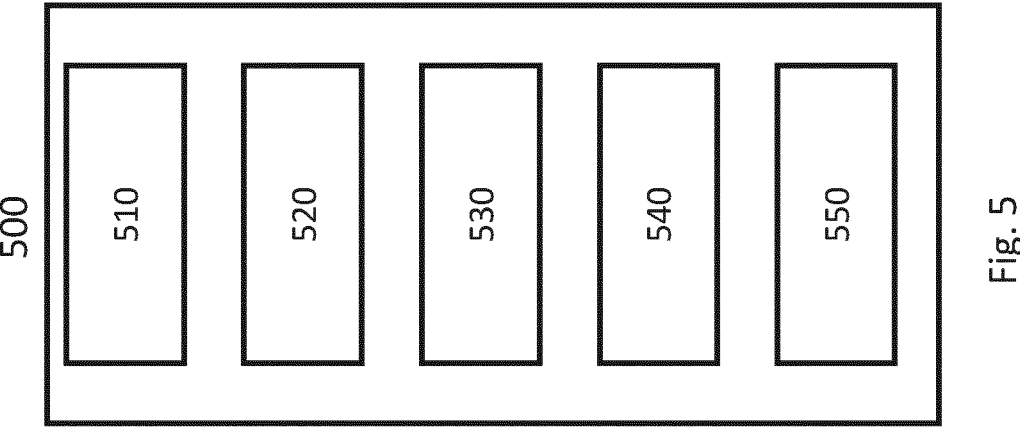
FIG. 5 is a schematic diagram illustrating a receiver device in accordance with embodiments of the present invention.

FIG. 5 is another schematic diagram illustrating another receiver device 500 in accordance with some embodiments of the present invention. The receiver device 500 may further comprise any of the functionality of the receiver device as disclosed in WO 2014/167318 A2, the entire contents of which are incorporated herein by reference. As shown in FIG. 5, the receiver device 500 comprises receiving circuitry 510, differential detector circuitry 520, combining circuitry 530, decision circuitry 540 (which are the same as the receiving circuitry 310, differential detector circuitry 320, combining circuitry 330 and decision circuitry 340 discussed above) and also comprises matched filter bank detection circuitry 550, the matched filter bank detection circuitry 550 comprising at least correlator circuitry, means for correcting a frequency offset, and a matched filter bank as disclosed in WO 2014/167318 A2, for compensating for carrier frequency drift and/or offset and using a matched filter bank approach for demodulation.

Hence in some embodiments, the receiver device 500 further comprises the matched filter bank detection circuitry 550, the matched filter bank detection circuitry 550 comprising: correlator circuitry configured to estimate a frequency offset between a carrier frequency of the received radio signal and a nominal carrier frequency; means for correcting the frequency offset; and a matched filter bank (MFB) comprising a plurality of filters each of which corresponds to a different bit pattern, wherein the receiver device is configured to obtain information from a respective filter of the plurality of filters relating to a phase for the current symbol interval. Therefore, in addition to the differential detector circuitry, the receiver device may further comprise the matched filter bank detection circuitry 550 providing an end user with greater flexibility by enabling the use of MFB-based detection.

Any synchronisation information required by the receiver device for appropriately sampling at symbol intervals can be recovered from a preamble portion of a received data packet alone. Hence, the receiver device may produce synchronisation information corresponding to a data packet, the synchronisation information indicative of a symbol timing information for the data packet. In this way, sampling of the received signal at intervals corresponding to the symbol timing can be performed.

Moreover, in order to obtain symbol timing information for a data packet (i.e. where each data symbol starts and finishes within the data packet), a synchronisation word (or "sync word") or the address at a beginning of a packet may be correlated with a known sequence in order to achieve an estimate of the symbol timing. This sync word, known to both the transmitter and the receiver, is typically provided near the beginning of each frame, which the receiver can use to perform operations such as symbol timing recovery, frequency offset compensation, phase synchronisation, Automatic Gain Control (AGC) training and frame synchronisation, before the receiver decodes the message data (i.e. the payload) from the frame.

Figure 6:
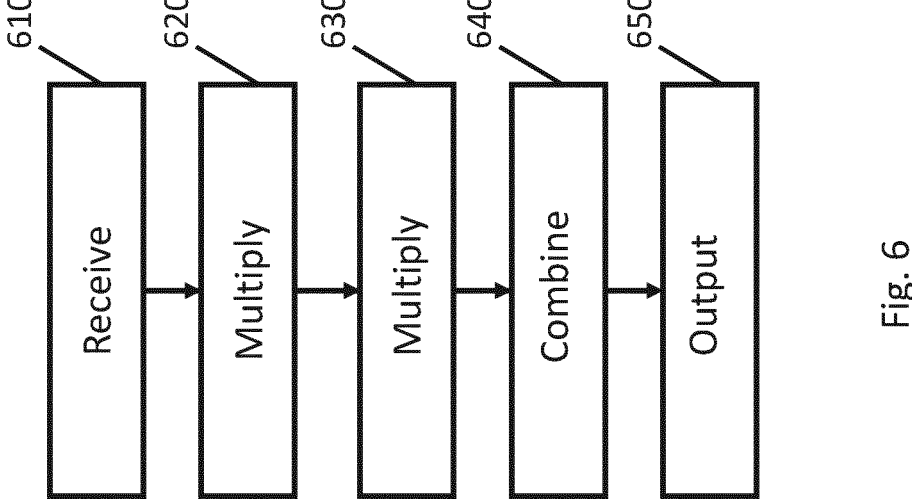
FIG. 6 is a schematic flowchart illustrating a method in accordance with embodiments of the present invention.

Referring now to FIG. 6, in accordance with embodiments of the disclosure a method is provided comprising:

receiving (at a step 610) a radio signal modulated using frequency shift keying or phase shift keying, the radio signal comprising a plurality of symbol intervals;

multiplying (at a step 620), by differential detector circuitry, a signal for a current symbol interval with a first reference signal and outputting a first output signal for the current symbol interval, wherein the first reference signal corresponds to a conjugate of a signal for a first symbol interval preceding the current symbol interval;

multiplying (at a step 630), by the differential detector circuitry, the signal for the current symbol interval with a second reference signal and outputting a second output signal for the current symbol interval, wherein the second reference signal corresponds to a conjugate of a signal for a second symbol interval preceding the first symbol interval, in which the signal for the second symbol interval has been phase adjusted in dependence on a previous phase decision for the first symbol interval;

combining (at a step 640) the first output signal and the second output signal to obtain a combined signal for the current symbol interval; and outputting (at a step 650) a phase decision for the current symbol interval in dependence upon the combined signal.

It will be appreciated by those skilled in the art that the embodiments of the invention described above has significant potential advantages. It will also be apparent that numerous modifications and variations of the present disclosure are possible in light of the above teachings. It is therefore to be understood that within the scope of the appended claims, the disclosure may be practiced otherwise than a specifically described herein.

The invention claimed is:

1. A receiver device comprising:

receiving circuitry configured to receive a radio signal modulated using frequency shift keying or phase shift keying, the radio signal comprising a plurality of successive symbol intervals;

differential detector circuitry configured to:

multiply a signal for a current symbol interval with a first reference signal and output a first output signal for the current symbol interval, wherein the first reference signal corresponds to a conjugate of a signal for a first symbol interval preceding the current symbol interval; and multiply the signal for the current symbol interval with a second reference signal and output a second output signal for the current symbol interval, wherein the second reference signal corresponds to a conjugate of a signal for a second symbol interval preceding the first symbol interval, in which the conjugate of the signal for the second symbol interval has been phase adjusted in dependence on a previous phase decision for the first symbol interval preceding the current symbol interval;

combining circuitry configured to combine the first output signal for the current symbol interval and the second output signal for the current symbol interval to obtain a combined signal for the current symbol interval; and decision circuitry configured to output a phase decision for the current symbol interval in dependence upon the combined signal.

2. The receiver device according to claim 1, wherein the receiver device is configured to use the phase decision for the current symbol interval as a feedback decision for obtaining a phase decision for one or more symbol intervals after the current symbol interval.

3. The receiver device according to claim 2, wherein for a next symbol interval subsequent to the current symbol interval, the differential detector circuitry is configured to:

multiply a signal for the next symbol interval with an updated first reference signal and output a first output signal for the next symbol interval, wherein the updated first reference signal corresponds to a conjugate of a signal for the current symbol interval preceding the next symbol interval; and multiply the signal for the next symbol interval with an updated second reference signal and output a second output signal for the next symbol interval, wherein the updated second reference signal corresponds to a conjugate of a signal for the first symbol interval preceding the current symbol interval, in which the conjugate of the signal for the first symbol interval has been phase adjusted in dependence on the phase decision for the current symbol interval, the combining circuitry is configured to combine the first output signal for the next symbol interval and the second output signal for the next symbol interval to obtain a combined signal for the next symbol interval, and the decision circuitry is configured to output a phase decision for the next symbol interval in dependence upon the combined signal for the next symbol interval.

4. The receiver device according to claim 1, wherein the differential detector circuitry is configured to multiply the signal for the current symbol interval with a third reference signal and output a third output signal for the current symbol interval, wherein the third reference signal corresponds to a conjugate of a signal for a third symbol interval preceding the second symbol interval, in which the conjugate of the signal for the third symbol interval has been phase adjusted in dependence on a previous phase decision by the decision circuitry for the second symbol interval and a previous phase decision by the decision circuitry for the first symbol interval.

5. The receiver device according to claim 4, wherein the combining circuitry is configured to combine the first output signal for the current symbol interval, the second output signal for the current symbol interval and the third output signal for the current symbol interval to obtain the combined signal for the current symbol interval, and the decision circuitry is configured to output the phase decision for the current symbol interval in dependence upon the combined signal for the current symbol interval.

6. The receiver device according to claim 1, wherein the differential detector circuitry comprises a first delay circuit and a second delay circuit, wherein the first delay circuit is configured to output the conjugate of the signal for the first symbol interval preceding the current symbol interval, and wherein the second delay circuit is configured to output the conjugate of the signal for the second symbol interval preceding the first symbol interval.

7. The receiver device according to claim 6, wherein the differential detector circuitry comprises phase rotator circuitry configured to receive the conjugate of the signal for the second symbol interval preceding the first symbol interval and to apply a phase adjustment in dependence on the previous phase decision for the first symbol interval preceding the current symbol interval.

8. The receiver device according to claim 7, wherein the first delay circuit is configured to output the conjugate of the signal for the first symbol interval to first multiplier circuitry configured to output the first output signal, and wherein the phase rotator circuitry is configured to output the conjugate of the signal for the second symbol interval preceding the first symbol interval and having the phase adjustment to second multiplier circuitry configured to output the second output signal.

9. The receiver device according to claim 1, wherein the differential detector circuitry comprises a plurality of delay circuits each configured to receive a signal for a same symbol interval of the plurality of symbol intervals and to output a respective time delayed version of the signal for the given symbol interval, wherein each delay circuit is configured to output said respective time delayed version of the signal according to a different integer multiple of a time period corresponding to a respective symbol interval.

10. The receiver device according to claim 1, further comprising processing circuitry configured to select a number of previous phase decisions to be provided from the decision circuitry to the differential detector circuitry as feedback decisions for obtaining the combined signal for the current symbol interval.

11. The receiver device according to claim 10, wherein the processing circuitry is configured to select a first number of previous phase decisions to be provided as feedback decisions from the decision circuitry to the differential detector circuitry for a first mode of operation, and the processing circuitry is configured to select a second number of previous phase decisions to be provided as feedback decisions from the decision circuitry to the differential detector circuitry for a second mode of operation.

12. The receiver device according to claim 1, wherein the combining circuitry is configured to combine the first output signal and the second output signal according to either maximum ratio combining or equal gain combining.

13. The receiver device according to claim 1, further comprising matched filter bank detection circuitry comprising:

correlator circuitry arranged to estimate a frequency offset between a carrier frequency of the received radio signal and a nominal carrier frequency;

means for correcting the frequency offset; and a matched filter bank (MFB) comprising a plurality of filters each of which corresponds to a different bit pattern, wherein the receiver device is configured to obtain information from a respective filter of the plurality of filters relating to a phase for the current symbol interval.

14. The receiver device according to claim 1, wherein the receiving circuitry is configured to receive the radio signal and the radio signal has been modulated using one from the list consisting of: FSK; 2FSK; GFSK; 2 GFSK; DPSK; QPSK; and DQPSK.

15. A method comprising:

receiving a radio signal modulated using frequency shift keying or phase shift keying, the radio signal comprising a plurality of symbol intervals;

multiplying, by differential detector circuitry, a signal for a current symbol interval with a first reference signal and outputting a first output signal for the current symbol interval, wherein the first reference signal corresponds to a conjugate of a signal for a first symbol interval preceding the current symbol interval;

multiplying, by the differential detector circuitry, the signal for the current symbol interval with a second reference signal and outputting a second output signal for the current symbol interval, wherein the second reference signal corresponds to a conjugate of a signal for a second symbol interval preceding the first symbol interval, in which the signal for the second symbol interval has been phase adjusted in dependence on a previous phase decision for the first symbol interval;

combining the first output signal and the second output signal to obtain a combined signal for the current symbol interval; and outputting a phase decision for the current symbol interval in dependence upon the combined signal.

16. A non-transitory machine-readable storage medium bearing instructions which, when executed by a receiver device, causes the receiver device to perform a method comprising:

receiving, the radio signal modulated using frequency shift keying or phase shift keying, the radio signal comprising a plurality of symbol intervals;

multiplying, by differential detector circuitry, a signal for a current symbol interval with a first reference signal and outputting a first output signal for the current symbol interval, wherein the first reference signal corresponds to a conjugate of a signal for a first symbol interval preceding the current symbol interval;

multiplying, by the differential detector circuitry, the signal for the current symbol interval with a second reference signal and outputting a second output signal for the current symbol interval, wherein the second reference signal corresponds to a conjugate of a signal for a second symbol interval preceding the first symbol interval, in which the signal for the second symbol interval has been phase adjusted in dependence on a previous phase decision for the first symbol interval;

combining the first output signal and the second output signal to obtain a combined signal for the current symbol interval; and outputting a phase decision for the current symbol interval in dependence upon the combined signal.

* * * * *